July 7, 1931. W. J. BROOKS 1,813,274

TIRE CHAIN

Filed March 11, 1929

Witness
Vinton Read.

Inventor
William J. Brooks
by Bair, Freeman & Sinclair
Attorneys

Patented July 7, 1931 1,813,274

UNITED STATES PATENT OFFICE

WILLIAM J. BROOKS, OF DES MOINES, IOWA

TIRE CHAIN

Application filed March 11, 1929. Serial No. 346,178.

The object of my invention is to provide a tire chain of simple, durable and comparatively inexpensive construction.

A further object of my invention is to provide a tire chain especially adapted to prevent skidding by arranging portions of the cross chains at angles instead of extending straight across the tread of the tire.

More particularly, it is my object to provide in connection with the angularly arranged cross chains, a link of special construction adapted to be connected with them at three points in such a way that this link stands in an upright position on the tire and thus more effectively acts to prevent skidding.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 3:
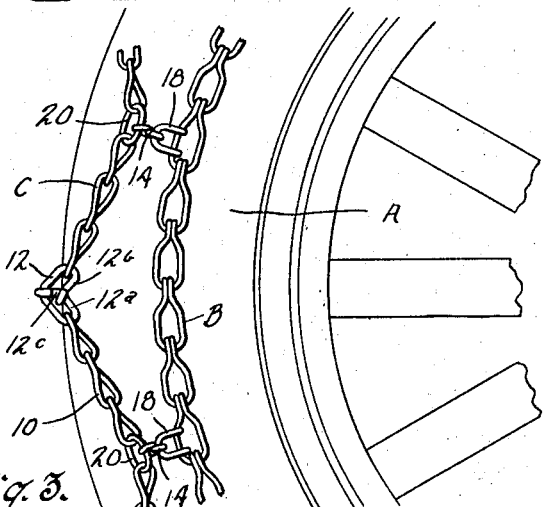
Figure 3 illustrates the tire chain applied to the tire of an automobile wheel.

On the accompanying drawings, I have used the reference character A to indicate the tire of an automobile wheel in connection with which, my improved type of tire chain is illustrated in Figure 3 of the drawings.

The chain itself consists of side chains B and cross chains C. The side chains B may be of ordinary link construction and provided with fastening devices of any desired type, whereby the entire tire chain may be applied to the tire A.

The cross chains C consist of angularly arranged chains 10, special connecting links 12 and twisted connecting links 14. The twisted links 14 and 16 are connected with the side chains B by links 18 and with the angularly arranged cross chains 10 by rings or the like 20.

The links of the cross chains 10 may be of the quarter-twist type and the links 14 and 16 of the half-twist type or of any other desirable type, which may operate efficiently to produce a strong and serviceable tire chain.

Figure 1:
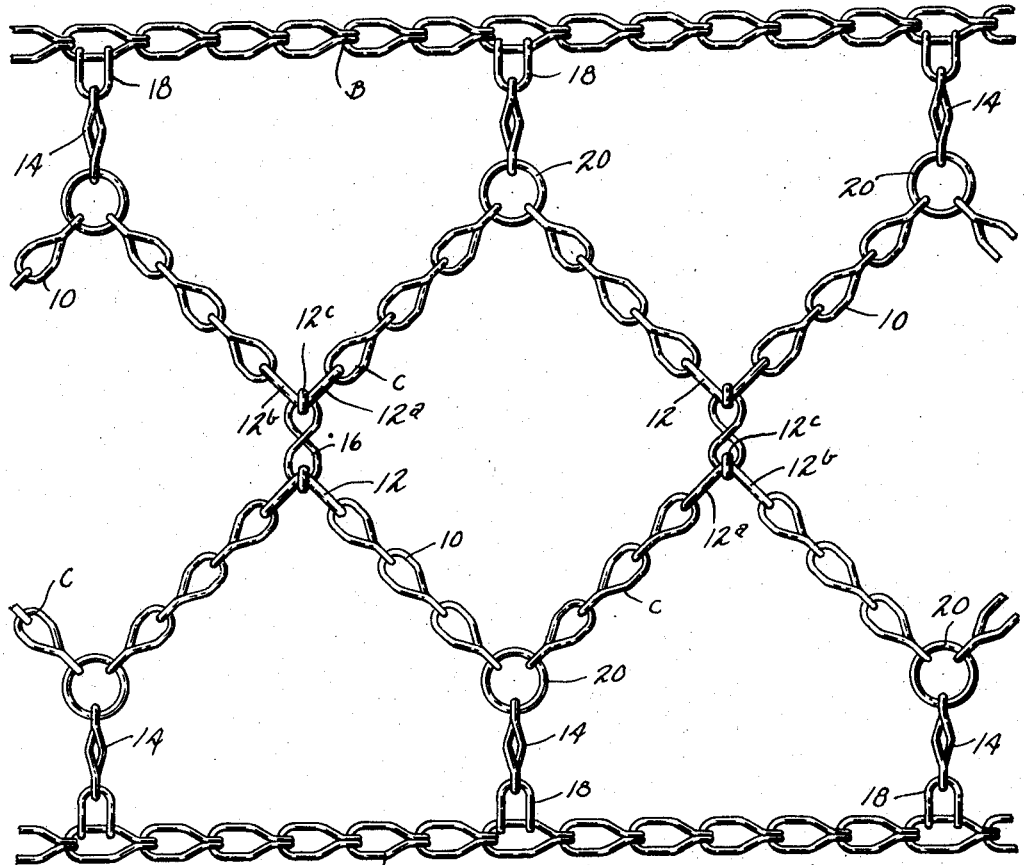
Figure 1 is a lay-out view of a portion of a tire chain embodying my invention.
Figure 2:
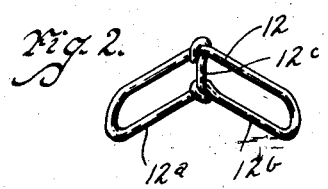
Figure 2 is a perspective view of the special link used in the construction thereof.

The special links 12 are V-shaped, as clearly illustrated in Figures 1 and 2 of the drawings, the two legs of the link being indicated as 12a and 12b.

A cross bar 12c is provided, around which the links 16 extend. The links of the cross chains 10 extend through the legs 12a and 12b of the special link 12.

It will be noted that the links 12, when viewed from above, as shown in Figure 1, so that they appear as being V-shaped, will stand upright on the tread of the tire and thus serve as a projection to engage in mud for the purpose of forming a more efficient mud lug to aid in the traction power of the tire to which the chain is applied.

This is one of the desirable features of my chain construction and the special link 12 will stay in the desired upright position, due to its shape and to the angular cross chains 10 extending at an angle so as to exert a pull in conjunction with the links 16 on the special links, which will maintain them in an upright position.

By arranging the special link in such a way that the cross chains are connected to it at three points, the cross chains (which of course will be taut when applied to a tire) will serve to maintain the special link in the desired position where it will always remain upstanding on the tread of the tire.

It will be noted that the special links 12 are bent at an angle of approximately ninety degrees, and this angle I have found to be the one most resistant to side skidding. The angle, of course, can be varied which will change the effectiveness of the link for the purpose of resisting side skidding, as may be desired.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a tire chain, a pair of side chains, angularly arranged cross chains and a closed link connection included in said cross chains, said closed link connection being V-shaped by bending the link whereby two V-shaped legs are formed, one of said legs being in contact with a tire to which the tire chain is applied and the other one being spaced therefrom.

2. In a tire chain construction including side chains and cross chains, a special link, to at least three points of which, parts of the cross chains are connected, said special link being formed of a pair of parallel parts in different planes and arranged to be retained by the connection of said cross chains to said three points with one of said parts in contact with a tire to which the tire chain is applied and the other part thereof spaced from said tire.

3. A tire chain link comprising a link having at least three connecting points, said link being so bent that parallel side portions thereof lie in intersecting planes and when the link is connected with a least three cross chain elements of a tire chain, one of said side portions contacting with the surface of the tire to which the chain is applied and the other of said sides is retained spaced therefrom.

4. A tire chain link comprising a closed rectangular shaped link having one half thereof bent out of the plane of the other half whereby the two halves form the legs of a V, said link, when assembled in a tire chain and positioned on a tire, having one of its V-shaped sides in contact with the tire and its other V-shaped side spaced therefrom.

5. A tire chain link comprising a rod of material formed into a substantially rectangular link, one-half of said link being bent out of the plane of the other half thereof, whereby it assumes a V-formation and a connector portion arranged at the apex of such V-formation, the ends of said rod of material being connected with intermediate portions of the rod and at the ends of said connector portions.

Des Moines, Iowa, March 1, 1929.

WILLIAM J. BROOKS.